Oct. 31, 1950 G. D. FLEAK 2,527,803
DISPLAY DEVICE
Filed May 18, 1949 3 Sheets-Sheet 1

Inventor:
Glen D. Fleak.
By Zabel and Gritzbaugh
Attorneys

Oct. 31, 1950          G. D. FLEAK          2,527,803
DISPLAY DEVICE

Filed May 18, 1949          3 Sheets—Sheet 2

Fig. 2.

Inventor.
Glen D. Fleak.
By Zabel and Gritzbaugh
Attorneys

Oct. 31, 1950   G. D. FLEAK   2,527,803
DISPLAY DEVICE
Filed May 18, 1949   3 Sheets-Sheet 3
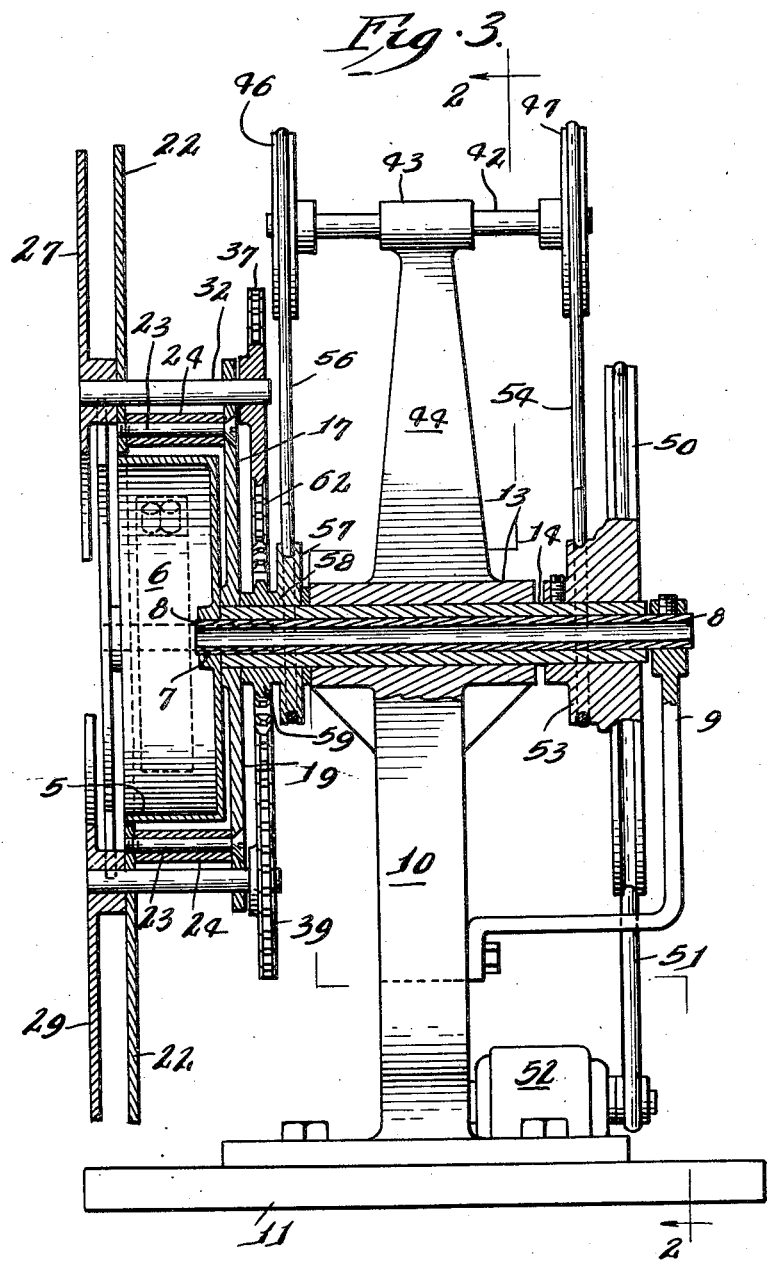
Inventor
Glen D. Fleak.
By Zabel and Gritzbaugh
Attorneys.

Patented Oct. 31, 1950

2,527,803

UNITED STATES PATENT OFFICE 2,527,803

DISPLAY DEVICE

Glen D. Fleak, Beaumont, Tex., assignor of one-half to Marion J. Johnson, Orange, Tex.

Application May 18, 1949, Serial No. 93,895

3 Claims. (Cl. 40—34)

My invention relates to a display device of a type that is particularly useful for show window advertising.

One object of the invention is to provide such a device that possesses a high degree of animation. This characteristic insures that the device will be effective and attention-compelling in the extreme.

Another object is to provide a device of this character that can be constructed at low cost, and which is extremely inexpensive to operate and maintain.

By way of introduction, a display device constructed according to my invention has a central portion that is adapted to receive display material. This material may be a physical object such as a package of cigarettes, for example.

The aforesaid central portion is located behind a structure that is adapted to be rotated at a comparatively high speed. The front surface of this rotatable structure is formed in such a manner that during operation of the device the central portion is covered and uncovered in a gradual, continuous and periodic manner. In this way the object on display appears, disappears and reappears in successive cycles.

The effect thus created by the device of my invention is unusual and extremely attention-compelling. To the observer, the object on display is for a moment fully and clearly visible. Then, a "fog" of gradually increasing intensity is produced in front of the object. This "fog" at first partially, and later completely, screens the object from view. The "fog," while somewhat difficult to describe, appears somewhat as a jagged star wherein the points gradually diminish in length and width so as to obscure the object in a gradual manner.

At one extreme of the cycle, the object on display is substantially concealed from view.

Thereafter, the "fog" begins to diminish in intensity until presently the object on display comes into full, uncovered view. This completes a cycle which in turn is followed by successive, similar cycles.

The attention-compelling characteristics and general effectiveness of my display device may be enhanced in a pronounced manner by the use of colors. According to this aspect of my invention, the surface of the structure in front of the central portion contains an almost countless number of different colors, and the color on any one surface increment is continuously changing.

This effect is produced by the phenomena observed when two or more colors are successively passed before the eyes at a rapid rate. When this is done the plurality of colors appears to blend into a single color. This single color, of course, is a composite one, and it depends upon the color and relative amounts of the respective component colors. For example, if part of a disk were colored yellow, and the other part were colored blue, the disk when rotated at a few hundred R. P. M. would appear to be colored green. The same effect occurs when colored material such as paint is physically mixed together.

In the form of my invention hereinafter described, the aforesaid rotatable structure disposed in front of the central portion is made up essentially of a plurality of individual disks. The respective axes of these disks are generally parallel to, but spaced laterally from, the rotational axis of the rotatable structure. Each disk is divided into a number of pie-shaped segments, and each segment is colored with a pure color. Thus, for example, each disk may have segments colored red, yellow, green and blue. The various disks rotate on their own axes at a comparatively slow speed, say one or two R. P. M.

Since the individual disks are spaced laterally from the axis of the rotatable structure, it will be seen that when an individual disk rotates upon its own axis, the various colors on the disk are shifted radially with respect to the axis of the rotatable structure. As the rotatable structure itself travels at several hundred R. P. M., a constantly changing color scheme is produced throughout the entire surface of the structure. The changing color scheme, of course, occurs as a result of the changing radial positions of the various colors on the rotatable structure, as well as the rapid rotation of the structure itself.

Other objects and advantages of my invention will be apparent as the description proceeds, reference being had to the accompanying drawings wherein one form of the invention is shown. It is to be understood that the description and drawings are illustrative only, and are not to be taken as limiting the invention except insofar as it is limited by the claims.

In the drawings:

Fig. 2 is a view in section on line 2—2 of Fig. 3, and

Fig. 3 is a view of the device partly in side elevation and partly in vertical section.

Figure 1:
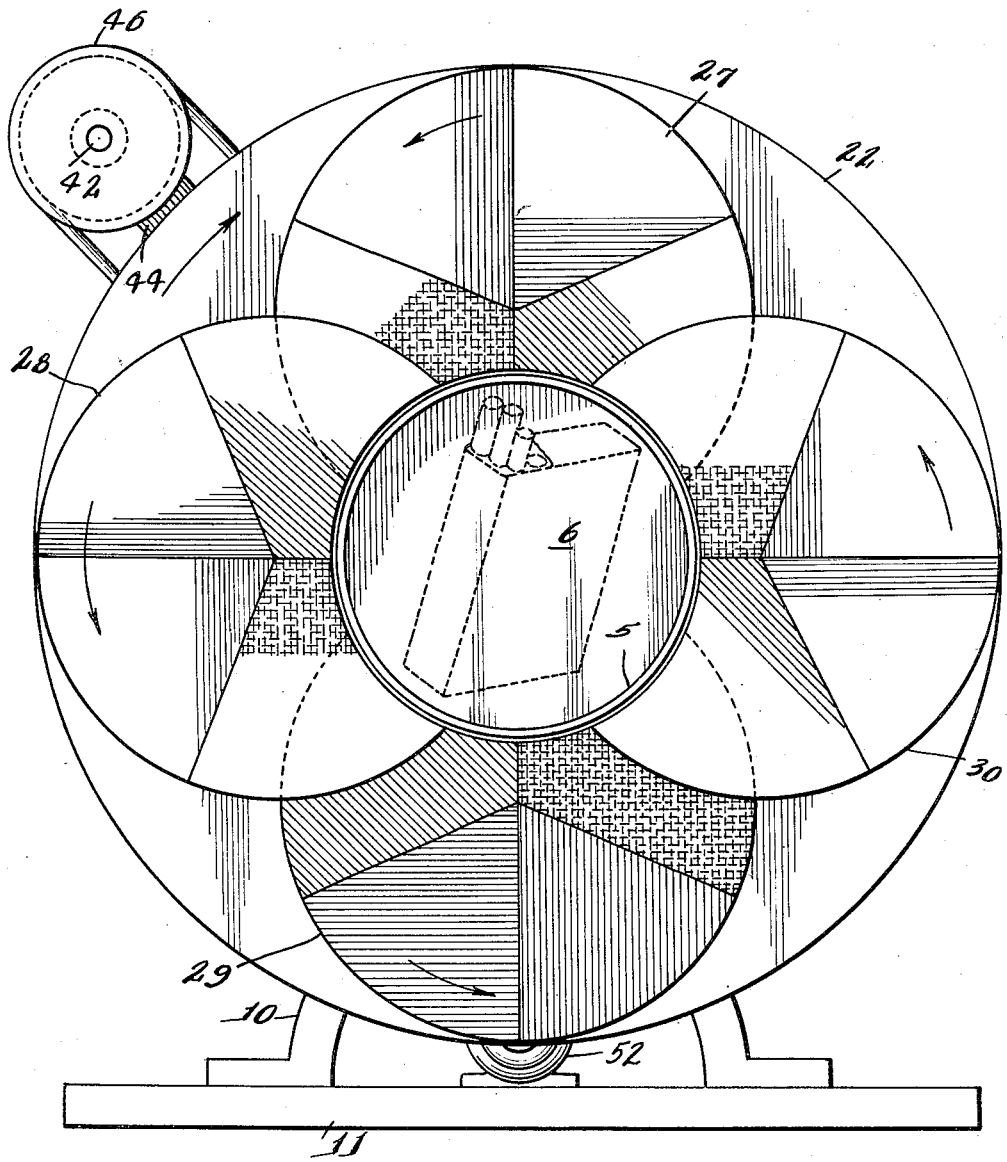
Fig. 1 is a view in front elevation of a display device embodying my invention.

Referring now to the drawings, the illustrated form of my invention has a central display portion 5 (Figs. 1 and 3). This portion may be cupshaped in form as best shown in Fig. 3. As previously mentioned, the central portion is adapted to receive an object for display, such, for example, as a package of cigarettes 6.

Central portion 5 is rigidly mounted at 7 (Fig. 3) to an elongated shaft 8 which is clamped against rotation at its right hand end by connection with a bracket 9 extending from an upright standard 10. The latter is mounted as shown upon a suitable base 11.

A cylindrical bearing 13 is provided at the upper end of standard 10. A hollow main shaft 14 is journalled within bearing 13 for comparatively high speed rotation, the shaft extending at both ends beyond the bearing. The aforesaid elongated shaft 8 is journalled within rotating hollow shaft 14.

A cross-shaped structure having arms 17, 18, 19 and 20 (Fig. 2) is rigidly mounted at the forward end of main shaft 14. The arms extend radially somewhat beyond the outer limits of central portion 5.

A rotatable supporting structure, here shown as large disk 22, is mounted to the cross-shaped structure by means of bolts 23 that extend through hollow posts 24. The hollow posts serve to space large disk 22 from the cross-shaped structure by a distance corresponding generally with the depth of central portion 5.

From the description so far, it will be seen that main shaft 14, the cross-shaped structure consisting of arms 17, 18, 19 and 20, large disk 22, bolts 23 and posts 24 are rigidly connected together, and thus they all move as one upon rotation of shaft 14.

Disk 22, the rotatable supporting structure, has a central aperture of substantially the same size as central portion 5 for the purpose of exposing the central portion to view from the front. Accordingly, an object displayed in central portion 5 is visible from the front at all times insofar as disk 22 is concerned.

A plurality of smaller disks 27, 28, 29 and 30 (Fig. 1) are mounted for rotation upon their own axes on the front face of disk 22, the rotatable supporting structure. The planes of the various smaller disks are generally parallel with the plane of disk 22.

The smaller disks are of such size and are so mounted on the face of disk 22 that they substantially cover the front surface of disk 22, including the aforesaid central aperture in the latter disk. In the form of the invention shown, the smaller disks are about one half the diameter of disk 22. The axis of each smaller disk is located generally at the midpoint of a radius of supporting disk 22. Also, the smaller disks are equally spaced about the center of disk 22.

Each smaller disk has a cutaway portion so that at one angular position of the respective disks, central portion 5 and the contained object 6 are fully exposed to view from the front of the device. The disks with the described portions cut away are characterized clearly by the disks 28 and 30 in Fig. 1. Also, it will be noted from this figure, as well as Fig. 3, that disks 27 and 29 lie in a plane between the common plane of disks 28 and 30 and supporting disk 22. By offsetting various of the smaller disks in this manner, it is possible to have adjacent disks overlap so that substantially the entire central portion of supporting disk 22 is completely covered by the smaller disks.

The front surface of the smaller disks preferably are provided with a plurality of colors, the various colors being applied in disk segments as shown in Fig. 1. Color conventions have been used in the drawing to show a suggested satisfactory color arrangement. The colors on each disk are red, blue, green and yellow.

Disks 27, 28, 29 and 30 are respectively mounted on shafts 32, 33, 34 and 35 which are appropriately journalled for free rotation in the cross-shaped structure and supporting disk 22. Sprocket wheels 37, 38, 39 and 40 are rigidly mounted on the respective shafts 32, 33, 34 and 35, the sprocket wheels being uniform in size and lying in a common plane. Rotation of a sprocket causes corresponding rotation of its associated disk.

The drive mechanism of my device, presently to be described in detail, employs a countershaft 42 (Figs. 2 and 3). This countershaft is journalled in a bearing 43 that is carried on the end of an arm 44 projecting from main bearing 13. Countershaft 42 has pulleys 46 and 47 fixed to its free ends. As will be seen, countershaft 42 is mounted in operative relation to main shaft 14.

A main drive pulley 50, driven by a belt 51 extending from a suitable power source 52, is rigidly mounted at the right hand end of main shaft 14 (Fig. 3). The power source should be capable of driving pulley 50 at the rate of a few hundred R. P. M. As one suggested value, I have found that the rate of 800 R. P. M. results in highly satisfactory performance of my device.

A pulley 53 is likewise rigidly mounted on shaft 14, and this pulley is connected by a belt 54 to pulley 47 on countershaft 42. Thus pulley 53 drives pulley 47 and the countershaft.

Pulley 46 at the left hand end of the countershaft (Fig. 3) drives a belt 56 that in turn drives a pulley 57 carried on a short hollow shaft 58. A sprocket 59 also is rigidly mounted on hollow shaft 58.

The short hollow shaft 58 is journalled for rotation on shaft 14. Thus, shaft 58 and its associated pulley 57 and sprocket 59 are arranged to rotate upon but independently of shaft 14.

Sprocket 59 lies in the same plane as the aforesaid sprockets 37, 38, 39 and 40. A chain 62, best shown in Fig. 2, gangs these five sprockets together so that they rotate in synchronism. Thus, sprocket 59 synchronously drives the respective sprockets 37, 38, 39 and 40 which in turn cause disks 27, 28, 29 and 30 to rotate on their own individual axes.

In order for disks 27, 28, 29 and 30 to rotate on their own individual axes, it is necessary that hollow shaft 58 be caused to rotate at a speed slightly different than the speed of main shaft 14 which is driven by the power source through main pulley 50. One method of bringing about this speed relationship will now be described.

If pulley 57 were the same size as pulley 46, and if the pulley 47 were the same size as pulley 53, then hollow shaft 58 and its sprocket 59 would be driven at the same angular speed of rotation as main pulley 50. This speed, in the example given, is 800 R. P. M. As mentioned, it is necessary that hollow shaft 58 be driven at a slightly different speed. It is immaterial whether the speed of shaft 58 be slightly greater or slightly less than the speed of main shaft 14 and pulley 50.

This necessary speed differential can be achieved by making one of the four pulleys (57, 46, 47, 53) of a different diameter than the pulley to which it is belt connected. For example, it may be assumed that the pulley 53 is made slightly larger than its associated pulley 47. The other three pulleys, and particularly pulleys 57 and 46, may be of a uniform size. Accordingly, when pulley 53 is driven by main pulley 50 at 800 R. P. M., the pulley 47, which is driven by pulley 53 through belt 54, rotates at a few R. P. M. faster than pulley 53. The speed of pulley 47 is transferred to pulley 46 and, through belt 56, to pulley 57 and hollow shaft 58. In other words, hollow shaft 58 is driven at a speed of a few R. P. M., say one or two, for example, faster than main shaft 14 on which it is mounted.

This one or two R. P. M. difference in speed is transmitted from sprocket 59 on hollow shaft 58 through chain 62 to the various sprockets associated with the smaller disks. Thus the smaller disks are caused to turn upon their own axes at the rate, in the example given, of one or two R. P. M. The rotation of these disks is, of course, synchronized by reason of the chain and sprocket drive so that the disks will retain proper orientation with each other. Proper orientation is such that at one angular position of the disks, the cutaway portions of the disks will register with central portion 5, as shown in Fig. 1. This exposes the object on display to full view from the front.

During operation of my display device, supporting disk 22 is, in the example given, driven at the comparatively fast speed of 800 R. P. M. The driving connection that brings this about may be traced briefly as follows: belt 51 from power source, pulley 50, main shaft 14, the cross-shaped member having arms 17, 18, 19 and 20, bolts 23 and hollow posts 24 to disk 22.

At any particular angular position of the smaller disks 27, 28, 29 and 30 upon their own axes, there is a particular arrangement of the various colors on the smaller disks with respect to the radii of rapidly rotating disk 22. This color arrangement, of course, produces a blend of colors as disk 22 rotates. In general, there is a different color produced at every point along a radius of disk 22. The various colors appear as concentric circular bands.

As has been explained, the smaller disks 27, 28, 29 and 30 rotate slowly upon their own individual axes. This comparatively slow rotation causes continuous relocation of the colors of the smaller disks with respect to the radius of the disk 22. This relocation of the colors produces a constantly changing color scheme throughout the entire area covered by the smaller disks. This color effect is extremely striking and attention-compelling to say the least.

The "fog" effect produced by my display device has previously been mentioned. It results primarily from the fact that the individual disks 27, 28, 29 and 30 have cutaway portions as best shown in Fig. 1. Referring to this figure, the individual disks are respectively oriented so that the cutaway portions register with central portion 5. Accordingly, the object on display, cigarettes 6 in the illustration, is in full view from the front of the device.

Rotation of the individual disks 27, 28, 29 and 30 at a slow rate gradually moves the cutaway portions of the disks out of register with central portion 5. Thus central portion 5 gradually is covered by the disks.

This gradual covering up action, occurring as it does in connection with the rapid rotation of supporting disk 22, produces the above mentioned "fog" effect. The "fog" is of low intensity at first, and it gradually increases in intensity as the disks cover more and more of central portion 5. Finally central portion 5 is completely covered, and the object on display is fully concealed to view from the front, i. e. there is a maximum intensity "fog."

Disks 27, 28, 29 and 30 continue their individual rotation to bring the cutaway portions thereof first into partial and then complete registration with the front of central portion 5. This causes the maximum intensity "fog" to "lift" in intensity and presently to disappear.

Thus the object on display appears and disappears gradually in a continuous and periodic manner during operation of my display device. This effect, though generally independent of the changing color effect, is produced in part by the same mechanisms that produce the color effect.

In the description, drawings and appended claims I have described and illustrated such well known mechanical elements as pulleys, sprockets, belts, chains, disks, etc. It is to be understood that these particular elements have been selected by way of example only, and that it is not intended to limit the invention to the use of such elements where they can be replaced with presently known equivalents.

From the above description it is thought that the construction and advantages of my invention will be readily apparent to those skilled in the art. Various changes and modifications may be made without departing from the spirit or losing the advantages of the invention.

Having thus described my invention, what I claim as new and desire to secure by Letters Patent is:

1. A display device comprising a central portion for receiving a display, a supporting structure mounted for rotation with respect to said central portion, a plurality of disks mounted for rotation on said supporting structure, said disks each overlapping adjacent disks whereby to provide a substantially continuous area of disk surfaces in front of and radially outward of said central portion, said disks each having a cutaway portion so that at one angular position of the respective disks the said central portion is substantially fully exposed to view from the front, a main shaft adapted to be driven at the order of 800 R. P. M., said supporting structure being carried by said main shaft, a hollow shaft journalled on said main shaft, a positive drive connection between said two shafts, said drive connection providing a small departure from a 1 to 1 speed ratio so that the two shafts rotate at slightly different speeds, and a positive drive connection between said hollow shaft and the respective disks whereby said disks rotate on their own axes at a slow rate and a display carried by said central portion appears and disappears gradually in a continuous and periodic manner.

2. The combination of claim 1 wherein said first named positive drive connection includes a countershaft mounted in operative relation to said main shaft, a pulley fixed on said main shaft and a cooperating first pulley fixed on said countershaft, a belt connecting said pulleys in driving relation, a second pulley fixed on said countershaft, a cooperating pulley fixed on said hollow shaft, a belt connecting said last named pulleys in driving relation, at least one of said pulleys having a different diameter than the pulley to which it is belt connected whereby said hollow shaft is driven at a different speed than said main shaft.

3. The combination of claim 1 wherein said second named positive drive connection includes a sprocket fixed on said hollow shaft, a sprocket fixed to each of said disks, and an endless chain operatively engaging all of said sprockets.

GLEN D. FLEAK.

REFERENCES CITED

The following references are of record in the file of this patent:

UNITED STATES PATENTS

| Number | Name | Date |
|---|---|---|
| 1,009,839 | Hata | Nov. 28, 1911 |
| 1,684,534 | Campbell | Sept. 18, 1928 |
| 1,707,081 | Fleak | Mar. 26, 1929 |
| 1,725,851 | Craig | Aug. 27, 1929 |
| 2,252,347 | Luthy | Aug. 12, 1941 |
| 2,360,536 | Avery | Oct. 17, 1944 |